United States Patent [19]
Yoon et al.

[11] Patent Number: 5,642,172
[45] Date of Patent: Jun. 24, 1997

[54] IMAGE PROCESSING SYSTEM FOR ADJUSTING THE IMAGE CHARACTERISTICS OF A DISPLAY SYSTEM

[75] Inventors: Sang Han Yoon; Yeoung Ho Ha, both of Taegu, Rep. of Korea

[73] Assignee: LG Electronics Inc., Youngdungpo-gu, Rep. of Korea

[21] Appl. No.: 398,497

[22] Filed: Mar. 9, 1995

[30] Foreign Application Priority Data

Aug. 4, 1994 [KR] Rep. of Korea ............ 94-19283

[51] Int. Cl.$^6$ ............................. H04N 9/16; H04N 9/64
[52] U.S. Cl. ..................... 348/603; 348/603; 348/227
[58] Field of Search ............................. 348/227, 602, 348/603; H04N 9/16, 9/64

[56] References Cited

U.S. PATENT DOCUMENTS

| | | | |
|---|---|---|---|
| 4,584,598 | 4/1986 | Kutaragi | 348/227 X |
| 4,827,332 | 5/1989 | Miyake et al. | 348/227 |
| 5,132,825 | 7/1992 | Miyadera | 348/227 |
| 5,504,525 | 4/1996 | Suzcki | 348/229 |

*Primary Examiner*—John K. Peng
*Assistant Examiner*—Nathan J. Flynn
*Attorney, Agent, or Firm*—Christie, Parker & Hale, LLP

[57] ABSTRACT

An image compensation system and methods for video appliances to reproduce an optimum image, by the judged exterior environment and by compensating for an original image by judging exterior environment. According to the system and methods, a color sensor senses color of exterior lighting of an appliance, and provides electrical signals corresponding to color components of the sensed color. The signals are converted into a digital value by an analog-to-digital converter. A microprocessor judges the type of exterior lighting, by the digitized values, and searches for image compensation data according to the judged exterior lighting. It thereby makes a video processor compensate for an original image signal.

4 Claims, 6 Drawing Sheets

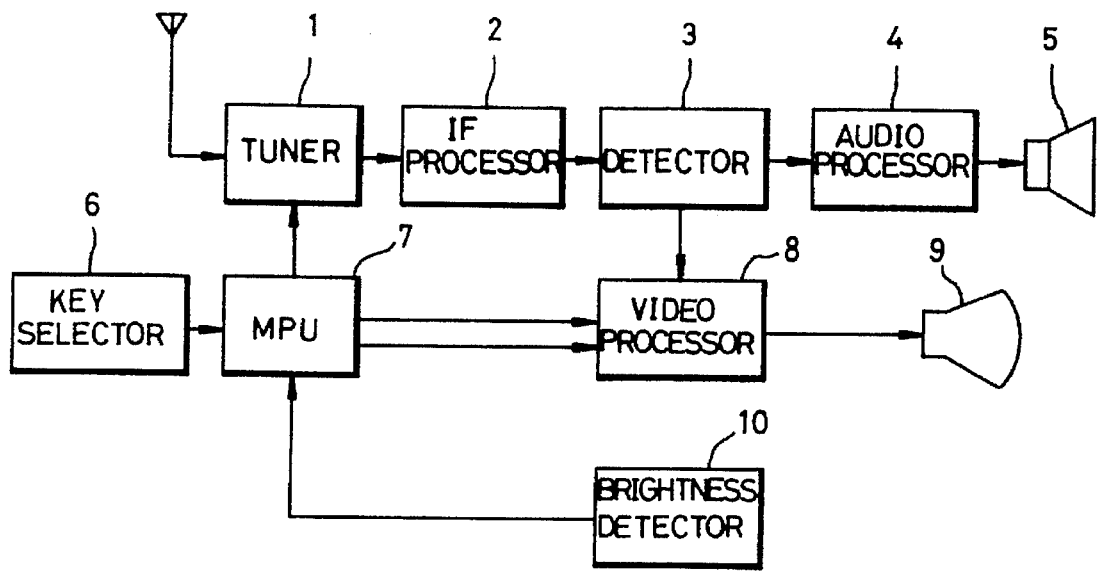
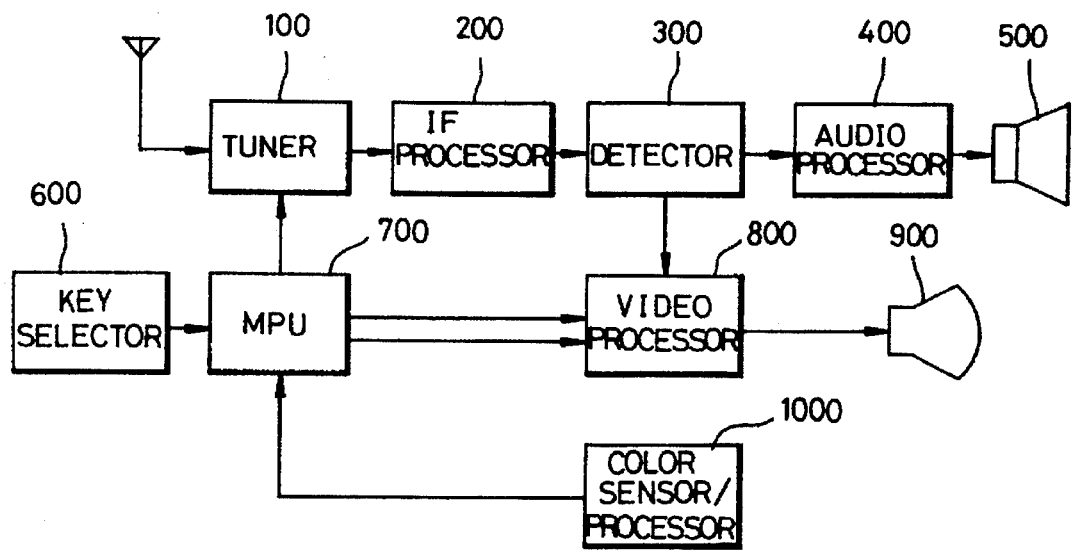
FIG. 2

| EXTERIOR ENVIRONMENT | RED | GREEN | BLUE |
|---|---|---|---|
| FLUORESCENT LAMP | 1.0 | 0.7 | 0.7 |
| INCANDESCENT LAMP | 0.8 | 0.3 | 0.4 |
| DAYLIGHT | 2.8 | 2.4 | 4.8 |
| DARKROOM | 0.4 | 0 | 0.2 |
| ⋮ | ⋮ | ⋮ | ⋮ |

FIG. 7A

| SUM OF R,G & B (S) \ ITEM | 0≤S<2 (0~10 lux) | 2≤S<10 (10~30 lux) | 10≤S<20 (30~50 lux) | 20≤S<31 (50~70 lux) | 31≤S<37 (70~85 lux) | 37≤S<45 (85~100 lux) | 45≤S (100 lux~) |
|---|---|---|---|---|---|---|---|
| CONTRAST | 30 | 40 | 55 | 70 | 85 | 93 | 100 |
| BRIGHTNESS | 40 | 42 | 46 | 50 | 54 | 57 | 60 |
| SATURATION | 40 | 41 | 45 | 48 | 51 | 53 | 55 |
| SHARPNESS | 30 | 33 | 39 | 45 | 51 | 55 | 60 |
| LIGHTING | NO LIGHT (DARKROOM) | INDIRECT (1) | INDIRECT (2) | STANDARD | STRONG (1) | STRONG (2) | DAYLIGHT |
| COMPENSATION STEP | FIRST | SECOND | THIRD | FOURTH | FIFTH | SIXTH | SEVENTH |

FIG. 7B

| VALUE OF R,G & B | | WHITE BALANCE (COLOR TEMPERATURE) | COLOR COORDINATE | | LIGHTING |
|---|---|---|---|---|---|
| | | | X | Y | |
| R+G+B ≥ 45 | | 13000 K | 266 | 280 | DAYLIGHT |
| R+G+B < 2 | | 9000 K | 270 | 284 | DARKROOM |
| 2 ≤ R+G+B < 45 | 0 ≤ B-R | 12000 K | 274 | 289 | FLUORESCENT LAMP |
| | 1 ≤ R-B ≤ 4 | 11000 K | 279 | 296 | FLUORESCENT LAMP + INCANDESCENT LAMP |
| | 5 ≤ R-B | 10000 K | 285 | 303 | INCANDESCENT LAMP |

IMAGE PROCESSING SYSTEM FOR ADJUSTING THE IMAGE CHARACTERISTICS OF A DISPLAY SYSTEM

BACKGROUND OF THE INVENTION

1. Field of the Invention

The present invention relates to an image compensation system and methods for video appliances, such as a color television receiver, etc., which compensates automatically for hue, saturation, contrast, brightness, and white balance of an image, corresponding with the exterior environment of the appliance.

2. Description of the Prior Art

Conventional video appliances, especially a television receiver generally adopts a skin color compensation circuit and an automatic brightness control circuit, as an image signal processor.

The skin color compensation circuit analyzes a received image signal, and if the signal is judged as a human skin color, the circuit provides a prescribed color, i.e., a skin color.

In practice, users often control human skin color when adjusting the picture of a television receiver. Skin color plays a standard part in adjusting the color of the picture.

The skin color compensation circuit, however, cannot properly cope with the variety of skin colors, because it merely checks without regard to exterior lightings whether or not an image signal is a skin color.

And it works in the same manner on colors analogous to skin color.

Therefore, an error in color reproduction may arise, and accordingly there will be some limiting factors on natural color reproduction.

The automatic brightness control circuit controls the brightness of a picture by sensing exterior brightness.

The attached FIG. 1 shows a bock diagram of a television receiver adopting the automatic brightness control circuit.

The television receiver is, with reference to FIG. 1, composed of a tuner 1 for tuning to an aiming station in broadcasting signals received by an antenna; an intermediate-frequency (hereinafter an "IF") signal processor 2 for processing an IF signal transformed from the tuned signal; a detector 3 for detecting an image signal and an audio signal from the IF signal processor 2; an audio processor 4 for processing the audio signal detected from the detector 3; a speaker 5 for making audio sound from the processed audio signal; a key selector 6, such as a key matrix, a remote control or the like, for providing a user's key instruction; a microprocessor unit (hereinafter an "MPU") 7 for allowing the tuner 1 to select an aiming station according to a user's key instruction, and for adjusting brightness of a picture by controlling the following video processor 8, corresponding with exterior brightness detected by the following brightness detector 10; a video processor 8 for controlling the brightness of a picture under the control of the MPU 7; a picture tube 9 for displaying the image processed by the video processor 8; and a brightness detector 10 for detecting exterior brightness, which provides it to the MPU 7.

In operation, the MPU 7 controls the tuner 1 to select an aiming station according to the instruction from the key selector 6. The selected station signal is transformed into an IF signal at the IF signal processor 2. The IF signal is provided to the detector 3.

The detector 3 detects an image signal and an audio signal from the IF signal and provides the image signal to the video processor 8 and the audio signal to the audio processor 4.

The audio processor 4 performs amplification of the audio signal and various functions, such as stereo reproduction or multivoice processing, and provides the processed signal to the speaker 5.

The video processor 8 performs amplification of the image signal and processing a color signal and a luminance signal, and provides the processed signals to the picture tube 9.

The brightness detector 10 detects exterior brightness using a sensor, such as a photoconductive cell (CdS), and converts the detected signal into a digital signal by an analog-to-digital converter built in the brightness detector 10.

The digitized signal is provided to the MPU 7. The MPU 7 performs an appropriate operation by using original brightness data CD, exterior brightness data Cl, and reference data CO, e.g., CD=CD×Cl/CO, and provides the resulting value to the video processor 8.

The video processor 8 compensates for the brightness data CD in accordance with the exterior brightness data Cl, and thereby the brightness of the picture tube 9 can be adjusted.

In such an automatic brightness control circuit, however, it is difficult to perform sufficient natural color reproduction because the circuit processes brightness (or contrast) only.

In fact, it is necessary to control all the image reproduction factors, i.e., hue, saturation, contrast, brightness, and white balance, for complete natural color reproduction. Without collective control of these factors, it is difficult to accomplish natural color reproduction, and it is difficult to properly represent an image bearing natural colors.

SUMMARY OF THE INVENTION

The present invention, which is directed to avoiding such a problem, reproduces an optimum image and performs complete natural color reproduction, by judging the exterior environment by sensing exterior lighting, and compensating for an original image based on the judged exterior environment.

According to one feature of this invention, there is provided an image compensation system for video appliances, comprising:

means for sensing a color of exterior lighting and for providing electrical signals corresponding to color components of said sensed color;

an analog-to-digital converter for converting the output signals of said color sensing means into a digital value;

means for processing the output signal of said analog-to-digital converter under the instruction of a prepared program, having (i) a memory for memorizing image compensation data corresponding to the color of exterior lighting, (ii) means for searching for corresponding data among said image compensation data, reading the output of said analog-to-digital converter, and (iii) means for outputting the searched data; and means for compensating for an original image signal utilizing the output signal of said processing means.

According to another feature of this invention, there are provided image compensation methods for video appliances, comprising the steps of:

sensing a color of exterior lighting and providing electrical signals corresponding to color components of said sensed color;

digitizing said electrical signals corresponding to said color components;

judging exterior environment from said digitized signal;

searching for image compensation data corresponding to said exterior environment; and compensating for an original image signal utilizing said image compensation data.

BRIEF DESCRIPTION OF THE DRAWINGS

These and other features, aspects, and advantages of the present invention will become better understood with regard to the following description, appended claims, and accompanying drawings where:

FIG. 1 is a block diagram of a television receiver adopting a conventional automatic brightness control circuit;

FIG. 2 is a block diagram of a television receiver adopting an image compensation system of the present invention;

FIG. 5 is a table showing the output value of color components from a color sensor, according to an exterior environment;

FIGS. 7A and 7B are tables showing image compensation data according to the summation of color components.

DETAILED DESCRIPTION OF THE PREFERRED EMBODIMENT

Figure 3:
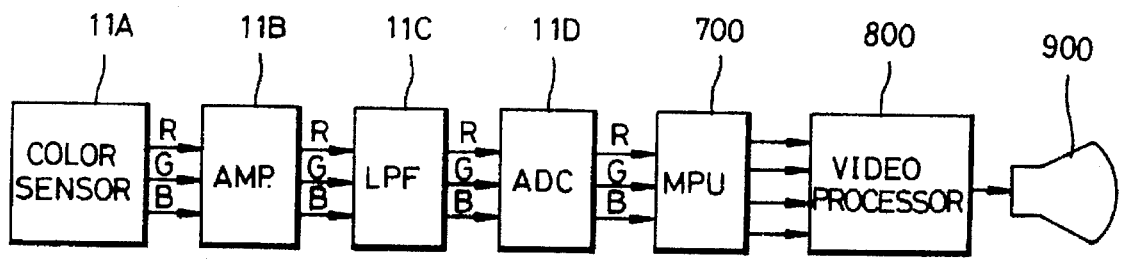
FIG. 3 is a detailed block diagram of a color sensor/processor as depicted in FIG. 2.

The operation of the present invention will be discussed in regard to FIG. 2 through FIG. 7.

Referring to FIG. 2, the system according to the present invention, an image compensation system for video appliances, is composed of: a tuner 100 for tuning to an aiming station in broadcasting signals received by an antenna; an IF signal processor 200 for processing an IF signal transformed from the tuned signal; a detector 300 for detecting an image signal and an audio signal from the IF signal processor 200; an audio processor 400 for processing the audio signal detected form the detector 300; a speaker 500 for making audio sound from the processed audio signal; a key selector 600, such as a key matrix, a remote control or the like, for providing a user'key instruction; an MPU 700 for allowing the tuner 100 to select an aiming station in accordance with a user'key instruction, and for adjusting brightness of a picture by controlling the following video processor 800, corresponding with exterior lightings and colors detected by the following color sensor/processor 1000; a video processor 800 for compensating for an original image signal under the control of the MPU 700; a picture tube 900 for displaying the image signal processed by the video processor 800; and a color sensor/processor 1000 for sensing and processing the exterior lightings and colors.

The color sensor/processor 1000 includes, referring to FIG. 3, a color sensor 11A for decomposing incident light into the three primary colors, i.e., red, green, and blue; an amplifier 11B for amplifying the color signals from the color sensor 11A; a low-pass filter 11C for eliminating noise from the amplified color signal; an analog-to-digital converter 11D for converting the analog color signal from the low-pass filter 11C into a digital signal.

The analog-to-digital converter is represented as an 'ADC' in the drawings for briefness. It may be equipped in the MPU 700 accordingly as the function of a microcomputer or microprocessor has recently been expanded.

Figure 4:
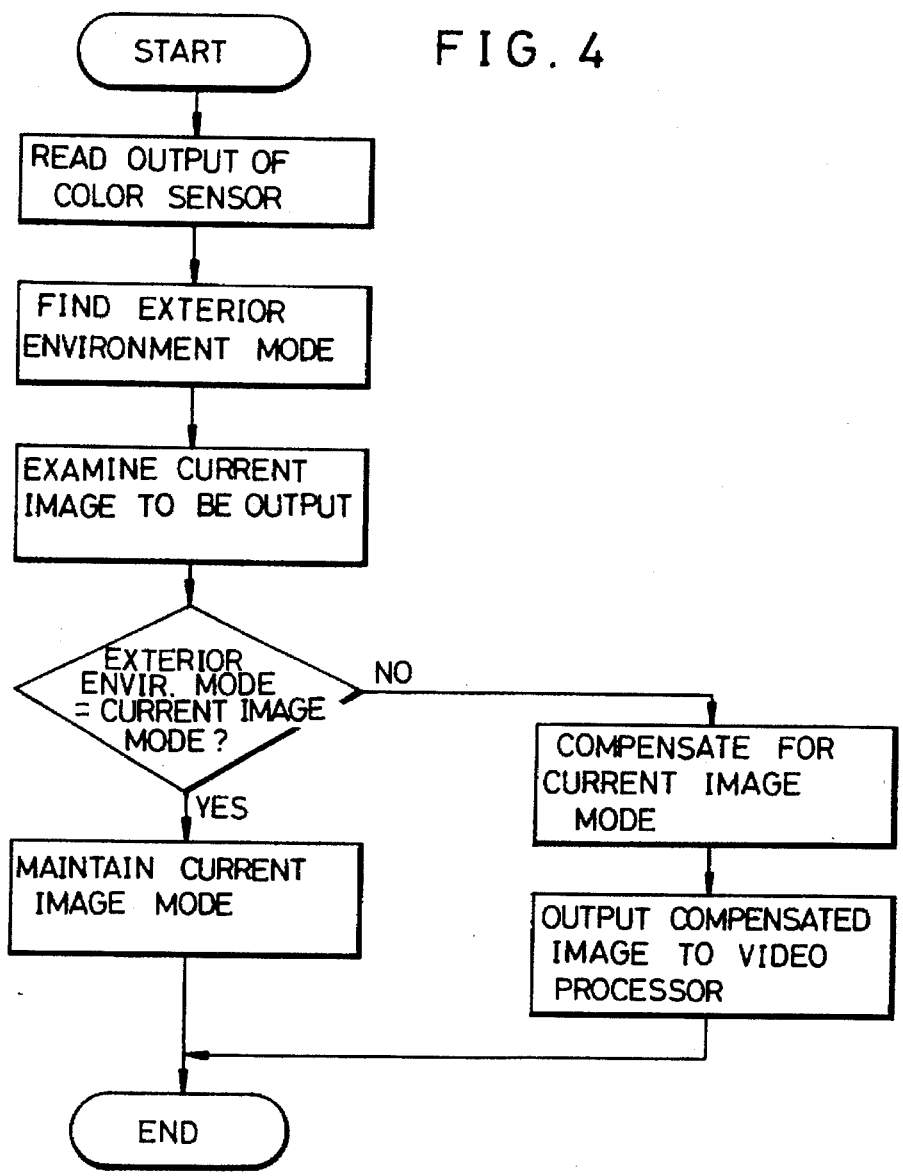
FIG. 4 is a flowchart explaining the general operations of the present invention.

The operation of such a constructed system, an image compensation system for video appliances, will be described with reference to FIGS. 2 and 3 and a flowchart in FIG. 4.

The MPU 700 controls the tuner 100 to select an aiming station in broadcasting signals according to the instruction from the key selector 600. The selected station signal is transformed into an IF signal at the IF signal processor 200, and is provided to the detector 300.

The detector 300 detects an image signal and an audio signal from the IF signal, and provides the audio signal to the audio processor 400 and the image signal to the video processor 800.

The audio processor 400 performs amplification of the audio signal and various functions, such as stereo reproduction or multivoice processing, and provides the processed signal to the speaker 500.

The video processor 800 performs amplification of the image signal and processing a color signal and a luminance signal, and provides the processed signals to the picture tube 900.

The color sensor/processor 1000 senses the color of exterior lightings, such as sunlight or any other artificial light, and amplifies the color signal and rejects noise. Thereafter the color sensor/processor 1000 provides the processed signal to the analog-to-digital converter 11D as color data.

The MPU 700 finds the current exterior lighting environment using the digitized color data. It thereafter provides a properly compensated image data (hue, saturation, contrast, brightness, and white balance) to the video processor 800.

Specifically, with reference to FIG. 3, the color sensor 11A decomposes the exterior lighting, such as sunlight or any other artificial light, into red (R), green (G), and blue (B). Because the output level of the color sensor is weak, it is provided to the low-pass filter 11C after being amplified by the amplifier 11B.

The low-pass filter 11C produces a purified color signal by eliminating noise from the signal outputted from the amplifier 11B (in the case of light bearing a low-frequency flicker, there is noise similar to a sinusoidal wave).

The color signal passing through the low-pass filter 11C is converted into a digital signal at the analog-to-digital converter 11D, and is provided as color data to the MPU 700.

The color data being provided, the MPU 700 analyzes current exterior lightings, and provides proper color compensation data to the video processor 800 using the result of analysis.

In general, colors of R, G, and B are called the three primary colors of light. By changing the mix ratio of the colors, almost all of the colors can be represented on a picture tube. For instance, in the case of white color, the projection degree of R, G, and B is '1', respectively: in the case of grey color, the projection degree is '0.5', respectively. If the three colors are not projected, black color is represented.

In contrast, a color sensor decomposes incident light into R, G, and B, and provides electrical signals proportional to the amount of the color components.

FIG. 5 shows an exemplary relative data of the output value of R, G, and B where exterior environment is a fluorescent lamp, an incandescent lamp, sunlight, or no light (darkroom).

The above data are served as reference data for judgement of what the current exterior environment is, which are stored in a memory in a microprocessor.

The general operation of the present invention will be described with reference to a flowchart in FIG. 4.

The MPU 700 reads a quantized color data (digitized output of the color sensor) directing the current exterior lightings, and judges thereby the exterior environment mode. It finds thereafter an original image mode to be outputted by retrieving the color data entering the video processor 800, and compares the original image mode with the exterior environment mode.

Here, although image compensation can be performed for all of the quantized color data from the color sensor, a processing sequence may become too complicated. In addition, because human eyesight is, as a matter of fact, not able to distinguish delicate color differences, only the artificial light used for common homes and natural light (including weather conditions and times) were taken into consideration.

Figure 6:
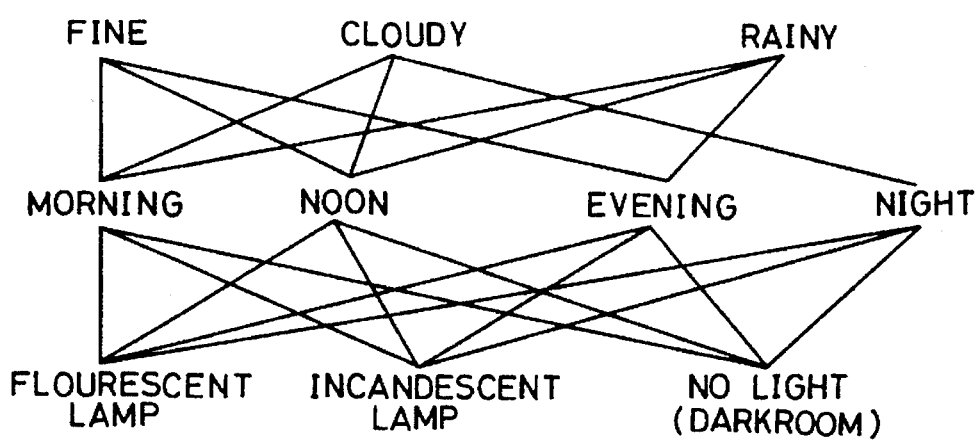
FIG. 6 is a view showing conditions of an exterior environment for storing data.

That is, as shown in FIG. 6, taking a fine day, a cloudy day, a rainy day, a morning, a noon, an evening, a night, a fluorescent lamp, an incandescent lamp, and no light (a darkroom) as factors for judgement to exterior environment, 36 kinds of exterior environment modes can be set. Since the correlation between night and weather is low and if the case that similar outputs are provided is considered, the number of cases may be reduced to an appropriate extent.

The exterior environment mode may be determined not only when the color data from the color sensor 11A is completely in accord with the prescribed reference data but also when the color data lies within the prescribed range.

In such cases, the MPU 700 compares the original image mode to be outputted with the exterior environment mode now being inputted.

If the two modes are the same, the MPU 700 outputs the untreated original image data to the video processor 800, and maintains the original image mode.

If the two modes are different, the MPU 700 compensates for the original image data by the determined exterior environment mode, and provides the compensated image mode to the video processor 800. Accordingly, the compensated image bearing the optimum hue, saturation, brightness, contrast, and white balance, which are in accordance with the exterior environment, is displayed on the picture tube 900.

Taking a set whose brightness step, saturation step, and contrast step respectively range from 0 to 62 and hue step ranges from −31 to +31 as an actual example, the set provides an image of hue=0, saturation=31, brightness=31, contrast=62, and white balance=9000K in the caes of no light (a darkroom); the set provides an image of hue=5, saturation=26, brightness=60, contrast=62, and white balance=10,000K in the case of an incandescent lamp.

Such data is based upon actual measurement. Although it may have a slight difference on the effect of any other environmental factor rather than illuminance or lighting, it deserves acceptance when considering human eyesight.

Since lighting of an incandescent lamp is brighter than no light, i.e., a darkroom, brightness of a picture must be strengthened. Since a red color component of an incandescent lamp is larger, a red color signal must be relatively reduced by controlling hue and saturation of a picture. Thus, there appears different data in each mode.

The representative feature of the embodiment so far discussed is to find the exterior environment by reading quantized color (R, G, and B) signals from a color sensor, and thereby to compensate for an original image.

Another embodiment compensating for received image data will be disclosed with reference to FIGS. 7A and 7B, and FIGS. 8A and 8B.

This embodiment relates to image compensation methods which compensate for an image data by computing the summation of the electrical value of the quantized or digitized color signal (R, G, and B), or by judging the magnitude of R and B and the correlation between them.

The summation (S) of the value of the quantized color signals R, G, and B (in the case of 6-bits) correlates with illuminance of the exterior lighting. From the value S, an image compensation data is, as a first step, determined, and thereby the original image data is compensated for. Thereafter, as a second step, white balance is compensated for by the value B-R or R-B as shown in FIG. 7B.

Specifically, FIG. 7A shows image compensation data of a set whose contrast step ranges from 30 to 100, the brightness step ranges from 40 to 60, the saturation step ranges from 40 to 55, and the sharpness step ranges from 30 to 60. As first image compensation data, the data are determined according to the summation of R, G, and B, i.e., the illuminance of exterior lighting.

FIG 7B shows, as second image compensation data, that if the summation of the quantized R, G, and B lies within a regular range, the data are determined by the difference and correlation between R and B.

The second image compensation data additionally compensates for white balance of a picture and accordingly accomplishes complete color reproduction according to the exterior lightings.

The system according to this embodiment reads the analog-to-digital quantized value from the color sensor, and computers R-B or B-R. Thereafter, it compares the value of R-B or B-R with G of exterior lighting, and thereby searches for image compensation data for brightness, saturation, contrast, sharpness, and white balance in a software table. The found image compensation data compensates for the original image data. Here, the reason for computing both R-B and B-R is that the software method is not capable of dealing with a negative computation.

Figure 8A:
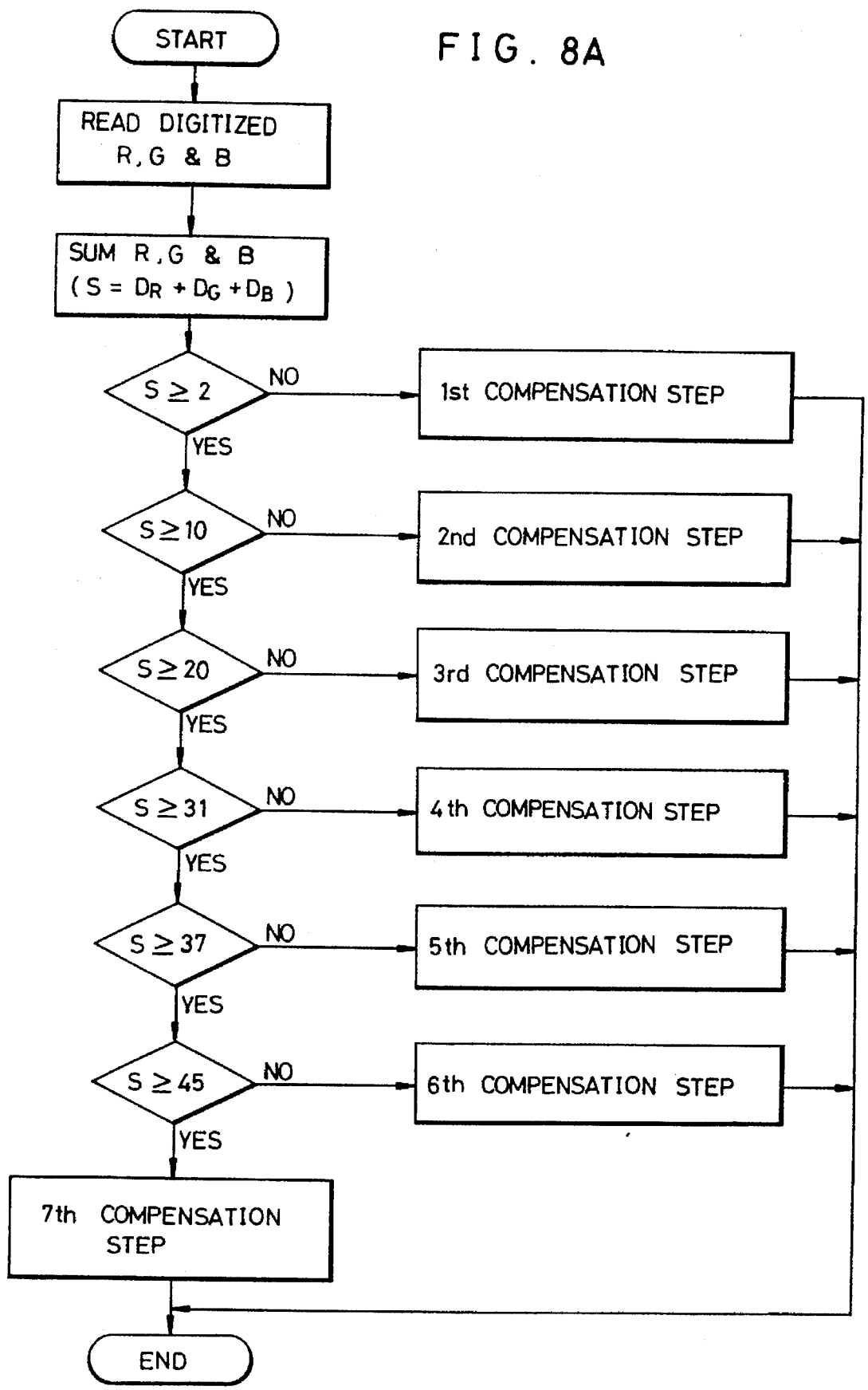
FIGS 8A and 8B are flowcharts explaining the operation of another embodiment of the present invention.
Figure 8B:
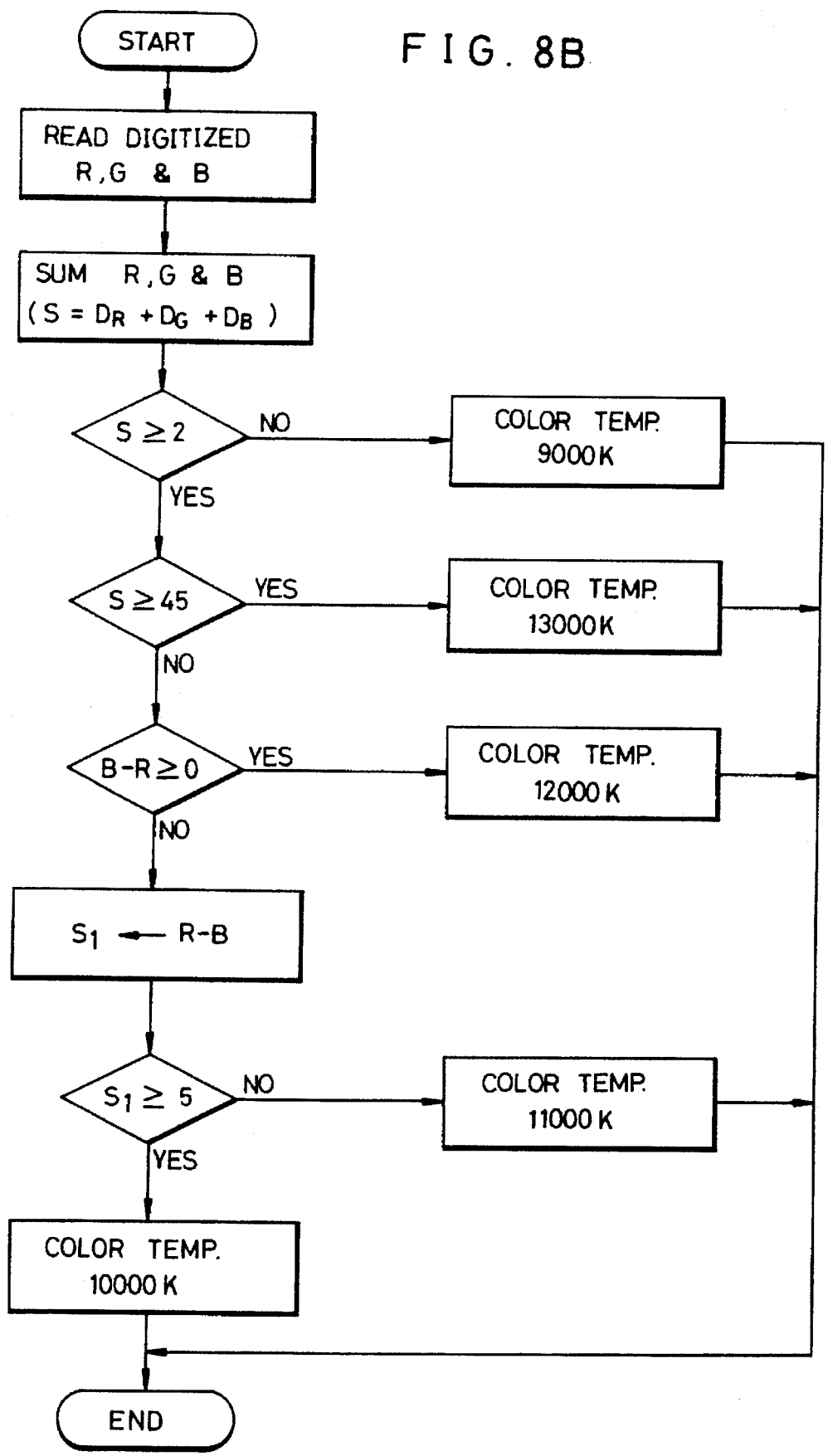

FIGS. 8A and 8B show flowcharts explaining the operation of this embodiment, based upon the tables indicated in FIGS. 7A and 7B. The flowcharts indicate how compensation data, according to the values of R, G, and B from the color sensor, are produced.

From the foregoing, the present invention measure image data, such as hue, contrast, brightness, saturation, and white balance, changing the conditions of exterior lightings. And it establishes a data base by the measured data. The data base is stored in a memory in a microprocessor.

The present invention determines current exterior environment using the measured data from the data base, and automatically compensates for hue, saturation, contrast, brightness, and white balance of a picture.

Accordingly, an image is reproduced with complete fidelity, and therefore a high-quality picture can be produced.

What is claimed is:

1. An image compensation method for video appliances, comprising the steps of:

sensing ambient light and providing a plurality of electrical signals each respectively corresponding to one of a plurality of color components of said ambient light;

summing values representing two or more of said plurality of electrical signals corresponding to said respective color components;

determining an ambient light mode based on said summed value;

producing a set of image compensation data corresponding to said determined ambient light mode; and compensating an original image signal utilizing said set of image compensation data.

2. An image compensation method for video appliances, comprising the steps of:

sensing ambient light and providing a plurality of electrical signals each respectively corresponding to one of a plurality of color components of said ambient light;

summing values representing two or more of said plurality of electrical signals corresponding to said respective color components;

determining an ambient light mode based on said summed value;

producing a first set of image compensation data corresponding to said determined ambient light mode;

producing a second set of image compensation data based on said summed value and correlation between said two or more values; and compensating an original image signal utilizing said first and second sets of image compensation data.

3. An image compensation system for a video appliance, comprising:

a sensor for generating a plurality of color signals, each color signal corresponding respectively to one of a plurality of color components of ambient light incident on said sensor;

a memory for storing a plurality of sets of compensation data, each set corresponding respectively to one of a plurality of ambient light modes and representing a plurality of image display characteristics; and a microcontroller comprising means for determining the respective ambient light mode based on a summation of two or more of said plurality of color signals, and means for selecting the set of compensation date stored in memory corresponding to the determined respective ambient light mode, said microcontroller generating a compensation signal based on the set of compensation data selected by the selecting means.

4. The image compensation system of claim 3, wherein the determining means determines the respective ambient light mode based further on a correlation of two or more of said plurality of color signals.

* * * * *

UNITED STATES PATENT AND TRADEMARK OFFICE
CERTIFICATE OF CORRECTION

PATENT NO. : 5,642,172
DATED : June 24, 1997
INVENTOR(S) : Sang Han Yoon; Yeong Ho Ha It is certified that error appears in the above-indentified patent and that said Letters Patent is hereby corrected as shown below:

On the title page, Item 75, Inventors, Yeoung Ho Ha" should read -- Yeong Ho Ha --.

Abstract, lines 2-4, replace "by the judged exterior environment and by compensating for an original image by judging exterior environment." with -- by judging the exterior environment and by compensating for an original image by the judged exterior environment. --.

Drawings, Sheet 1, identify the figure at the top of Sheet 1 as -- FIG. 1 (Prior Art) --.

Drawings, Sheet 3, identify the figure at the top of Sheet 3 as -- FIG. 5 --.

Column 2, line 32, replace "factors, it is difficult to" with -- factors, it is impossible to --.

Column 3, line 14, change "where" to -- wherein --.

Column 3, line 21, change "operations" to - operation --.

Column 3, line 31, change "FIGS 8A and 8B" to -- FIGS. 8A and 8B --.

Column 3, line 46, change "form" to -- from --.

Column 5, line 52, change "caes" to -- case --.

Column 5, line 53, change "hue=5" to -- hue= -5 --.

UNITED STATES PATENT AND TRADEMARK OFFICE
CERTIFICATE OF CORRECTION

PATENT NO. : 5,642,172
DATED : June 24, 1997
INVENTOR(S) : Sang Han Yoon; Yeong Ho Ha It is certified that error appears in the above-indentified patent and that said Letters Patent is hereby corrected as shown below:

Column 6, line 36, change "computers" to -- computes --.
Column 8, line 15, change "compensation date" to -- compensation data --.

Signed and Sealed this

Fourth Day of August, 1998

Attest:

BRUCE LEHMAN

Attesting Officer

Commissioner of Patents and Trademarks